(12) United States Patent
Penth et al.

(10) Patent No.: US 6,340,379 B1
(45) Date of Patent: *Jan. 22, 2002

(54) GAS FILTER, METHOD FOR PRODUCING A GAS FILTER AND USE OF SAID GAS FILTER

(75) Inventors: Bernd Penth, Lebach; Gerhard Hoerpel, Nottuln; Christian Hying, Rhede, all of (DE)

(73) Assignee: Creavis Gesellschaft fuer Technologie und Innovation mBH, Marl (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/308,222

(22) PCT Filed: Sep. 18, 1998

(86) PCT No.: PCT/EP98/05946

§ 371 Date: Jul. 26, 1999

§ 102(e) Date: Jul. 26, 1999

(87) PCT Pub. No.: WO99/15257

PCT Pub. Date: Apr. 1, 1999

(30) Foreign Application Priority Data

| Sep. 20, 1997 | (DE) | 197 41 498 |
| Mar. 18, 1998 | (DE) | 198 11 708 |
| Mar. 19, 1998 | (DE) | 198 12 035 |
| May 8, 1998 | (DE) | 198 20 580 |
| Jun. 3, 1998 | (DE) | 198 24 666 |

(51) Int. Cl.$^7$ .................. B01D 59/12; B01D 71/02; B01D 71/04
(52) U.S. Cl. .................. 95/45; 210/500.25; 210/500.26; 210/490; 96/11; 264/45.1; 55/523; 55/524; 428/307.7; 427/372.2
(58) Field of Search .................. 210/500.25, 500.26, 210/490, 505, 508, 510.1, 650; 264/45.1, 44, 46.4; 428/307.7; 427/372.2; 485/920; 55/524, 523; 204/554; 95/45; 96/11

(56) References Cited

U.S. PATENT DOCUMENTS

| 4,946,592 | * | 8/1990 | Raj et al. |
| 5,059,366 | * | 10/1991 | Goetz et al. |
| 5,376,442 | * | 12/1994 | Davidson et al. |
| 5,885,657 | | 3/1999 | Penth |

FOREIGN PATENT DOCUMENTS

| 0263468 | * | 10/1987 | (EP) |
| 0332789 | * | 3/1989 | (EP) |
| 0426546 | * | 10/1990 | (EP) |
| 0585152 | * | 7/1993 | (EP) |
| 0778076 | * | 11/1996 | (EP) |
| 96/00198 | * | 1/1996 | (WO) |

* cited by examiner

*Primary Examiner*—Ana Fortuna
(74) *Attorney, Agent, or Firm*—Oblon, Spivak, McClelland, Maier & Neustadt, P.C.

(57) ABSTRACT

A gas filter, a process for producing a gas filter and the use of the gas filter. The filtration of gases, in particular of gases which are contaminated by solids, e.g. automobile exhaust gases, is difficult since the solids which have been filtered out block the filter over the course of time. The gas filter of the invention can be used over relatively long periods of time since it is regenerable. The improvement achieved by the invention compared to conventional gas filters is that the filter comprises a composite material which can be heated in a simple manner by application of a voltage to the electrically conductive support material of the composite material and thermally decomposable substances which can block the filter can be decomposed. The filter of the invention can be used wherever gases which are contaminated by thermally decomposable solids have to be cleaned.

96 Claims, No Drawings

GAS FILTER, METHOD FOR PRODUCING A GAS FILTER AND USE OF SAID GAS FILTER

A gas filter, a process for producing a gas filter and use of this gas filter are claimed.

Air pollution is known to present a serious problem in many parts of the world. Depending on composition, the pollution can lead to health problems among the human population. Furthermore, the air pollution results in not inconsiderable economic loss. The air pollution can be in the form of gases or of liquids dispersed very finely in the air or in the form of tiny solid particles present in the air. The solid particles which may be present in the air and have been and are classified as carcinogenic include soot, especially soot (particulates) which gets into the air via the exhaust gases of diesel vehicles.

In many nations, regulations to regulate the maximum permissible emission of particulates from motor vehicles have been put in force.

Various methods and apparatus have already been developed for treating solids-containing gases.

U.S. Pat. Nos. 4,972,889 and 4,948,403 claim ceramic filter system which are able to filter soot or solid particles from the exhaust gases of diesel-powered vehicles.

A problem with these methods and apparatus is that the solid particles block the filter relatively quickly and the filters thus have to be replaced or regenerated at short intervals.

To regenerate blocked filters, there have been proposals for methods which burn the solids blocking the pores of the filter in motor vehicles by additional combustion of fuel. The disadvantage of these methods is that regeneration leads to an increased fuel consumption. In addition, the deep action of this method is only weak, so that blockages caused by particles in the filter cannot be remedied.

More recently, methods and apparatus which remove filtered-out solids from the filter by heating to 600° C. have been developed.

According to DE 3800723, additional heating wires are used for heating the filter.

EP 0275372 uses heating elements comprising wire, expanded metal or perforated foils for heating the filter.

GB 2193656 teaches a method and an apparatus which make use of wires between which a current flows when a conductive bridge of deposited soot forms.

U.S. Pat. No. 5,202,548 describes a filter which can be baked out by application of a voltage since it is equipped with electrically conductive honeycomb structures. U.S. Pat. No. 5,246,672 teaches the use of woven wire meshes and U.S. Pat. No. 5,254,840 teaches the use of a combination of metallic and ceramic honeycombs.

The filter materials used in the abovementioned methods or apparatus have relatively small surface areas and thus either a low filter action or, when the pores are made smaller to increase the filter action, a small gas throughput. If the surface area is large due to the use of porous materials, the pores become blocked very quickly. Filtering relatively large amounts of gas requires the use of large, relatively cumbersome gas filters which restricts the possible uses of such gas filters.

It is therefore an object of the present invention to find an economical process for producing a gas filter which, despite a small size, is able to filter large amounts of gas and which can be regenerated in a simple manner.

It has surprisingly been found that a gas filter which comprises a material-permeable composite material based on at least one open-structured and material-permeable support and having on at least one side of the support and in the interior of the support at least one inorganic component which comprises essentially at least one compound of a metal, a semimetal or a mixed metal with at least one element of main groups III to VII is able, even when small in size, to filter large amounts of gas and can be regenerated in a simple manner.

The present invention accordingly provides a regenerable gas filter for filtering gases which comprises a composite material based on at least one open-structured and material-permeable support and having on at least one side of the support and in the interior of the support at least one inorganic component which comprises essentially at least one compound of a metal, a semimetal or a mixed metal with at least one element of main groups III to VII.

The present invention likewise provides a reaenerable gas filter which comprises a composite material which is obtainable by application of a suspension which comprises at least one inorganic component comprising a compound of at least one metal, a semimetal or a mixed metal with at least one element of main groups III to VII and a sol to an open-structured and material-permeable support and by subsequent heating at least once during which the suspension comprising at least one inorganic component is solidified on or in or on and in the support.

The present invention also provides a process for producing a gas filter as claimed in any of claims 1 to 40, which comprises producing a material-permeable composite material by applying, in and on at least one open-structured and material-permeable support, at least one suspension which comprises at least one inorganic component comprising at least one compound of at least one metal, a semimetal or a mixed metal with at least one of the elements of main groups III to VII and a sol and by solidifying the suspension on or in or on and in the support material by subsequent heating at least once.

The present invention likewise provides for the use of a gas filter as claimed in any of claims 1 to 40 for cleaning waste or feed gases.

For the purposes of the present invention, material-permeable means that materials which have this property are permeable to at least a gas, a liquid or a solid. The permeability is dependent on the size of the pores, mesh openings or holes which these materials have.

The gas filter of the invention can be used for the filtration of an,; waste and feed gases from Which, for example, solid particle are to be removed. The gases to be filtered can also comprise vapor or droplets of liquid. The advantage of the gas filter of the invention is that, as a result of the use of an electrically conductive support material in the composite material, the latter can be baked out in a simple manner by application of a voltage and thus be regenerated. If the composite material comprises catalytically active materials, this heating only has to be carried out once if the decomposition of the thermally decomposable liquid droplets or solid particles is, in the case of a sufficiently hot filter, catalyzed by the catalytically active materials and thus proceeds swiftly. As a result, advantageously, a virtually constant amount of gas can pass through the filter since blocking of the filter by materials which are not thermally decomposable increases only very slowly.

A further advantage of the gas filter of the invention is that the novel composite material or gas filter can, due to the fact that it is bendable, be rolled or folded and the filter-active surface area of the filter can be very large in a small volume.

The gas filter of the invention is described below by way of example without being restricted thereby.

The regenerable gas filter of the invention for the filtration of gases comprises at least one composite material based on at least one open-structured and material-permeable support and having on at least one surface of the support and in the interior of the support at least one inorganic component which comprises essentially at least one compound of a metal, a semimetal or a mixed metal with at least one element of main groups III to VII. For the purposes of the present invention, interior of a support means, for example, hollow spaces or pores in a support. According to the invention, the regenerable gas filter comprises a composite material, -which is obtained by application of a suspension which comprises at least one inorganic component comprising a compound of at least one metal, a semimetal or a mixed metal with at least one element of main groups III to VII and a sol to an open-structured and material-permeable support and by heating at least once during which the suspension comprising at least one inorganic component is solidified on or in or else on and in the support.

According to the invention, the composite material or gas filter can be permeable to gases, solids or liquids, in particular to particles having a size of from 1.5 nm to 10 $\mu$m.

A support having intermediate spaces having a size of from 50 to 500 $\mu$m can advantageously be present in the composite material of the gas filter. This support can comprise woven or felted fibers, expanded metal or sintered metal. The support preferably comprises at least one at least partially electrically conductive material.

The intermediate spaces can be pores, mesh openings, holes, crystal lattice interstices or voids. The support can comprise at least one material selected from the group consisting of carbon, metals, alloys, glass, ceramics, minerals, plastics, amorphous substances, natural products, composite materials or at least one combination of these materials. The supports which can comprise the abovementioned materials can have been modified by a chemical, thermal or mechanical treatment method or a combination of treatment methods. Preferably, the composite material comprises a support comprising at least one metal, a natural fiber or a plastic which has been modified by at least one mechanical forming technique or treatment method, e.g. drazing, swaging, fulling, rolling, stretching or forging. Very particularly preferably, the composite material comprises at least one support comprising at least woven, bonded, felted or ceramically bound fibers or at least sintered or bonded shaped bodies, spheres or particles. In a further, preferred embodiment, a perforated support can be used. Material-permeable supports can also be ones which become or have been made material-permeable by laser treatment or ion beam treatment.

It can be advantageous for the support to comprise fibers of at least one material selected from the group consisting of carbon, metals, alloys, ceramics, glass, minerals, plastics, amorphous substances, composite materials and natural products or fibers of at least one combination of these materials, e.g. asbestos, glass fibers, rock wool fibers, carbon fibers, metal wires, steel wires, polyamide fibers, coconut fibers or coated fibers. Preference is given to using supports which comprise at least woven fibers of metal or alloys. Wires can also serve as metal fibers. The composite material very particularly preferably comprises a support comprising at least one woven mesh of steel or stainless steel, e.g. woven meshes produced from steel wires, steel fibers, stainless steel wires or stainless steel fibers by weaving, which preferably has a mesh opening of from 5 to 500 $\mu$m, particularly preferably mesh openings of from 50 to 500 $\mu$m and very particularly preferably mesh openings of from 70 to 120 $\mu$m.

The support of the composite material can, however, also comprise at least one expanded metal having a pore size of from 5 to 500 $\mu$m. According to the invention, the support can also comprise at least one granular, sintered metal, a sintered glass or a metal nonwoven having a pore width of from 0.1 $\mu$m to 500 $\mu$m, preferably from 3 to 60 $\mu$m.

According to the invention, the composite material comprises a support comprising at least aluminum, silicon, cobalt, manganese, zinc, vanadium, molybdenum, indium, lead, bismuth, silver, gold, nickel, copper, iron, titanium, platinum, stainless steel, steel, brass, an alloy of these materials or a material coated with Au, Ag, Pb, Ti, Ni, Cr, Pt, Pd, Rh, Ru and/or Ti.

The inorganic component present in the composite material or gas filter can comprise at least one compound of at least one metal, semimetal or mixed metal with at least one element of main groups III to VII of the Periodic Table or at least one mixture of these compounds. Here, the compounds of the metals, semi-metals or mixed metals can comprise at least elements of the transition series and main groups III to V or at least elements of the transition series or main groups III to V, with these compounds having a particle size of from 0.001 to 25 $\mu$m. The inorganic component preferably comprises at least one compound of an element of main groups III to VIII or at least one element of main groups III to V with at least one of the elements Te, Se, S, O, Sb, As, P, N, Ge, Si, C, Ga, Al or B or at least one compound of an element of main groups III to VIII and at least one element of main groups III to V with at least one of the elements Te, Se, S, O, Sb, As, P, N, Ge, Si, C, Ga, Al or B or a mixture of these compounds. Particularly preferably, the inorganic component comprises at least one compound of at least one of the elements Sc, Y, Ti, Zr, V, Nb, Cr, Mo, W. Mn, Fe, Co, B, Al, Ga, In, Tl, Si, Ge, Sn, Pb, Sb or Bi with at least one of the elements Te, Se, S, O, Sb, As, P, N, C, Si, Ge or Ga, e.g. $TiO_2$, $Al_2O_3$, $SiO_2$, $ZrO_2$, $Y_2O_3$, BC, SiC, $Fe_3O_4$, SiN, SiP, nitrides, sulfates, phosphides, silicides, spinels or yttrium-aluminum garnet or one of these abovementioned elements itself. The inorganic component can also comprise alumino-silicates, aluminum phosphates, zeolites or partially exchanged zeolites such as ZSM-5, Na-ZSM-5 or Fe-ZSM-5 or amorphous microporous mixed oxides which may contain up to 20% of non-hydrolyzable organic compounds, e.g. vanadium oxide-silicon oxide glass or aluminum oxide-silicon oxide-methylsilicon sesquioxide glasses.

Preferably, at least one inorganic component is present as a particle size fraction having a particle size of from 1 to 250 nm or having a particle size of from 260 to 10,000 nm.

It can be advantageous for the composite material to comprise at least two particle size fractions of at least one inorganic component. The particle size ratio of the particle size fractions in the composite material is from 1:1 to 1:10,000, preferably from 1:1 to 1:100. The composite material particularly preferably comprises at least one particle size fraction having an average particle size of from 0.3 to 3 $\mu$m. The ratio of the amounts of the particle size fractions in the composite material is preferably from 0.01:1 to 1:0.01.

The material permeability of the composite material can be limited to particles having a particular maximum size by means of the particle size of the inorganic component used. It can be advantageous for the composite material to have pores which are permeable to particles having a maximum size of from 0.1 to 10 μm, particularly preferably a maximum size of from 0.2 to 1.5 μm.

The suspension which comprises at least one inorganic component and by means of which the composite material of the invention can be obtained can comprise at least one liquid selected from the group consisting of water, alcohol and acid or a combination of these liquids.

In a further particular embodiment of the gas filter of the invention, the composite material comprises at least one catalytically active component. The catalytically active component can be identical to the inorganic component. This applies particularly when the inorganic component has catalytically active centers on the surface.

The catalytically active component present in the composite material is preferably at least one inorganic material, at least one metal or at least one organo-metallic compound which has catalytically active centers on its surface. The catalytic component present in the composite material is particularly preferably a zeolite such as ZSM-5, Fe-ZSM-5, silicalite or an amorphous microporous mixed oxide as described, for example, in DE 195 45 0442 and/or DE 195 06 843, e.g. vanadium oxide-silicon oxide glass or aluminum oxide-silicon oxide-methylsilicon sesquioxide glasses.

The composite material can, however, also comprise at least one oxide of at least one of the elements Mo, Sn, Zn, V, Mn, Fe, Co, Ni, As, Sb, Pb, Bi, Ru, Re, Cr, W, Nb, Hf, La, Ce, Gd, Ga, In, Tl, Ag, Cu, Li, K, Na, Be, Mg, Ca, Sr and Ba as catalytically active component.

In a particular embodiment of the material-permeable composite material, this comprises at least titanium suboxide as catalytically active component.

It can likewise be advantageous for the composite material to comprise, as catalytically active component, at least one metal compound selected from among the compounds of the metals Pt, Rh, Ru, Ir, Au, Ag, Os, Re, Cu, Ni, Pd and Co, or at least one metal selected from among the metals Pt, Rh, Ru, Ir, Au, Ag, Os, Re, Cu, Ni, Pd and Co.

Particularly preferred catalytic components are, for example, noble metals, noble metal compounds or materials coated with noble metal particles. The addition of the catalytically active component makes it possible to achieve a situation where the filter becomes blocked more slowly after heating once due to catalytic decomposition of thermally decomposable solids or liquids, since only particles which cannot be destroyed thermally block the filter. This particular embodiment enables the operating life of the filter of the invention to be increased considerably.

In a particularly preferred embodiment of the gas filter or composite material of the invention, this can be made bendable without destruction of the inorganic component solidified in the interior of the support and on the support. The composite material of the invention is able to be bent to a smallest radius down to 2 mm and preferably down to 1 mm.

Preferably, the composite material in the gas filter is rolled or folded in a suitable container having at least one gas inlet and at least one gas outlet, with the composite material being arranged so that the gas to be filtered has to pass, after entering the gas filter, at least once through the composite material before it can leave the gas filter via the gas outlet.

In one variant of the gas filter of the invention, thermally decomposable or sublimable or vaporizable solids or liquids which have been filtered from a filtered gas and block the pores of the composite material, e.g. soot or hydrocarbon particles, can be removed from the gas filter by baking out the gas filter by application of a voltage to the support of the composite material. Depending on the selected support material, preferably a support material having a low electrical resistance, the filter can be heated using a low voltage as is customary, for example, in motor vehicles, e.g. 12 or 24 V.

It can be advantageous for the gas inlet and the gas outlet to be provided with a flow- or pressure-measuring device by means of which the pressure or the amount of the gas entering and leaving the filter is measured and for the heating of the gas filter to be commenced on reaching a preset difference between the measured values, which represents a measure of the blocking of the composite material.

The process of the invention for producing the gas filter of the invention is described below, without being restricted thereto.

The gas filter of the invention can be produced by producing a material-permeable composite material by applying, in and/or on at least one open-structured and material-permeable support, at least one suspension which comprises at least one inorganic component comprising at least one compound of at least one metal, a semimetal or a mixed metal with at least one of the elements of main groups III to VII and a sol and by solidifying the suspension on or in or on and in the support material by subsequent heating at least once.

When carrying out the process of the invention, it can be advantageous to apply the suspension on and in or else on or in at least one support by printing, pressing-on, pressing-in, rolling-on, doctor blade coating, painting-on, dipping, spraying or casting.

The open-structured and material-permeable support can comprise a material selected from the group consisting of carbon, metals, alloys, ceramics, glass, minerals, plastics, amorphous substances, natural products, composite materials or at least one combination of these materials. The preferred support is a woven stainless steel or steel mesh.

The suspension used, which comprises at least one inorganic component and at least one metal oxide sol, at least one semimetal oxide sol or at least one mixed metal oxide sol or a mixture of these sols, can be produced by suspending at least one inorganic component in at least one of these sols. It can be advantageous for the suspension to comprise at least one catalytically active component. The catalytically active component can be identical to the inorganic component.

The sols are obtained by hydrolyzing at least one metal compound, at least one semimetal compound or at least one mixed metal compound using a liquid, a gas or a solid. It can be advantageous for the liquid used for hydrolyzing the compound to be hydrolyzed to be water, alcohol or an acid or a combination of these liquids or the solid used to be ice -or the gas used to be water vapor. It can likewise be advantageous for the compound to be hydrolyzed to be added prior to the hydrolysis to at least one alcohol or at least one acid or a combination of these liquids. As compound to be hydrolyzed, preference is given to hydrolyzina at least one metal nitrate, a metal chloride, a metal carbonate, a metal alkoxide compound or at least one semimetal alkoxide compound, particularly preferably at least one metal alkoxide compound, a metal nitrate, a metal chloride, a metal carbonate or at least one semimetal alkoxide compound selected from among the compounds of the elements Ti, Zr, Al, Si, Sn, Ce and Y or the lanthanides and actinides, e.g. zirconium alkoxide, silicon alkoxide or titanium alkoxide compounds, e.g. titanium isopropoxide, silicon alkoxides, zirconium alkoxides, or a metal nitrate such as zirconium nitrate.

It can be advantageous to carry out the hydrolysis of the compounds to be hydrolyzed using at least half the molar ratio of water, water vapor or ice, based on the hydrolyzable group, of the hydrolyzable compound.

The hydrolyzed compound can be peptized by treatment with at least one organic or inorganic acid, preferably a 10–60% strength organic or inorganic acid, particularly preferably a mineral acid selected from the group consisting of sulfuric acid, hydrochloric acid, perchloric acid, phosphoric acid and nitric acid and mixtures of these acids.

It is possible to use not only sols which have been prepared as described above but also commercial sols such as titanium nitrate sol, zirconium nitrate sol or silica sol.

It can be advantageous if at least one inorganic component having a particle size of from 1 to 10,000 nm is suspended in at least one sol. Preferably, an inorganic component comprising at least one compound selected from among metal compounds, semimetal compounds, mixed metal compounds and metal mixed compounds with at least one of the elements of main groups III to VI, or at least one mixture of these compounds, is suspended. Particularly preferably, at least one inorganic component comprising at least one compound selected from among the oxides of the transition elements or the elements of main groups III to V, preferably oxides selected from among the oxides of the elements Sc, Y, Ti, Zr, Nb, Ce, V, Cr, Mo, W, Mn, Fe, Co, B, Al, In, Tl, Si, Ge, Sn, Pb and Bi, for example $Y_2O_3$, $ZrO_2$, $Fe_2O_3$, $Fe_3O_4$, $SiO_2$, $Al_2O_3$, is suspended.

The proportion by mass of the suspended component is preferably from 0.1 to 500 times that of the hydrolyzed compound used.

In a particular variant, the sol used is preferably titanium dioxide sol acidified with mineral acid and/or the inorganic component used is preferable aluminum oxide having a particle size of from 0.3 to 3 $\mu$m.

It can be advantageous for at least one catalytically active component, e.g. a noble metal or a noble metal compound, to be added to the sol and to be incorporated into the gas filter or the composite material.

It an likewise be advantageous for at least one catalytically active component having a particle size of from 1 to 10,000 nm to be suspended in a sol. Preferably, at least one catalytically active component comprising at least one compound selected from among metal compounds, semimetal compounds, mixed metal compounds and metal mixed compounds with at least one of the elements of main groups III to VII or organic compounds, or at least one mixture of these compounds, is suspended. Particularly preferably, at least one catalytically active component comprising at least one compound selected from among aluminosilicates, aluminum phosphates, zeolites or partially exchanged zeolites, e.g. ZSM-5, Na-ZSM-5 or Fe-ZSM-5, and amorphous microporous mixed oxides which may contain up to 20% of non-hydrolyzable organic compounds, e.g. vanadium oxide-silicon oxide glass or aluminum oxide-silicon oxide-methylsilicon sesquioxide glasses, is suspended.

The proportion by mass of the suspended components is preferably from 0.1 to 500 times that of the hydrolyzed compound used.

Appropriate selection of the particle size of the suspended compounds as a function of the size of the pores, holes or intermediate spaces of the open-structured material-permeable support, but also the layer thickness of the composite material of the invention and the sol-solvent-metal oxide ratio, enable the freedom from cracks of the gas filter of the invention or the composite material to be optimized.

When using a woven mesh having a mesh opening of, for example, 100 $\mu$m, it is possible to increase the freedom from cracks by using, preferably, suspensions which comprise a suspended compound having a particle size of at least 0.7 $\mu$m. In general, the ratio of particle size to mesh opening or pore size should be from 1:1000 to 50:1000. The composite material of the invention preferably has a thickness of from 5 to 1000 $\mu$m, particularly preferably from 50 to 150 $\mu$m. The suspension comprising sol and compounds to be suspended preferably has a weight ratio of sol to compounds to be suspended of from 0.1:100 to 100:0.1, preferable from 0.1:10 to 10:0.1.

According to the invention, the suspension present on or in or else on and in the support can be solidified by heating the composite at from 50 to 1000° C. In a particular variant, the composite is subjected to a temperature of from 50 to 100° C. for from 10 minutes to 5 hours. In a further particular variant, the composite is subjected to a temperature of from 100 to 800° C. for from 1 second to 10 minutes.

The composite can be heated by means of heated air, hot air, infrared radiation, microwave radiation or electrically generated heat. In a particular embodiment of the process of the invention, it can be advantageous for heating to be carried out using the support material as electric resistance heating element. For this purpose, the support can be connected via at least two contacts to a power source. Depending on the power of the power source, the voltage which is applied and the intrinsic resistance of the electrically conductive support, the support heats up when the power is switched on and the suspension present in and on the support can be solidified thereby.

In a further, preferred embodiment of the process of the invention, solidification of the suspension can be achieved by the suspension being applied on or in or else on and in a preheated support and thus being solidified directly after application. In a further, particular embodiment of the process of the invention, it can be advantageous for at least one support to be unwound from a roll, passed at a speed of from 1 m/h to 1 m/s through at least one apparatus which applies the suspension on or in or on and in the support and at least one further apparatus which makes possible the solidification of the suspension on or in or on and in the support by heating and the composite material thus produced is wound up on a second roll. This makes it possible to produce the gas filter of the invention or the composite material by a continuous process.

In a further, particular embodiment of the process of the invention it can be advantageous to apply a ceramic or inorganic layer to a support which may be a composite material or a composite material produced by the process of the invention. This can be carried out, for example, by laminating a green (unsintered) ceramic layer or an inorganic layer which is, for example, present on an auxiliary film onto the support or by treating the composite material with a further suspension as described above. This composite can be strengthened by heating, e.g. by means of infrared radiation or a furnace.

The green ceramic layer used preferably comprises nanocrystalline powder of at least one semimetal oxide or metal oxide such as aluminum oxide, titanium dioxide or zirconium dioxide. The green layer can also comprise an organic binder.

The use of a green ceramic layer males it readily possible to provide the composite material of the invention with an additional ceramic layer which, depending on the size of the nanocrystalline powder used, restricts the material permeability of the composite material produced in this way to very small particles.

The green layer preferably comprises nanocrystalline powder having a particle size of from 1 to 1000 nm. If nanocrystalline powder having particle sizes of from 1 to 10 nm is used, the composite material of the invention to which an additional ceramic layer has been applied has a material permeability four particles having a size which corresponds to that of the particle size of the powder used. If nanocrystalline powder having a size above 10 nm is used, the ceramic layer is permeable to particles which are half the size of the particles of the nanocrystalline powder used.

The application according to the invention of at least one further inorganic layer or ceramic layer gives a composite material of the invention which has a pore gradient. In addition, multiple application of a layer makes it possible to produce composite materials having a particular pore size using even those supports whose pore size or mesh opening is not suitable for producing a gas filter or composite material having the required pore size. This may be the case, for example, when a gas filter or composite material having a pore size of 0.25 μm is to be produced using a support having a mesh opening of above 300 μm. To obtain such a gas filter or composite material, it can be advantageous to first apply to the support at least one suspension which is suitable for treating supports having a mesh opening of 300 μm and to solidify this suspension after application. The composite material obtained in this way can then be used as a support having a lower mesh opening or pore size. It is possible to apply to this support, for example, a further suspension which comprises, for example, a compound having a particle size of 0.5 μm.

The crack insensitivity of composite materials having large mesh openings or pore sizes can also be improved by applying suspensions which comprise at least two suspended compounds to the support. As compounds to be suspended, preference is given to using compounds which have a particle size ratio of from 1:1 to 1:10, particularly preferably from 1:1.5 to 1:2.5. The proportion by weight of the particle size fraction having the smaller particle size should nit exceed a pro portion of at most 50%, preferably 20% and very particularly preferably 10%, of the total weight of the particle size fractions used.

Despite the application of an additional ceramic layer or inorganic layer, which may comprise catalytically active components, to the support, the composite material of the invention can be bendable.

The gas filter of the invention or the composite material can also be produced by laying a support, which may, for example, be a composite material or another suitable support material, onto a second support which may consist of the same material as the first support or a different material or of two supports having a different material permeability or porosity. A spacer, a drainage material or another material suitable for conducting away materials, e.g. a composite fabric, can be laid between the two support materials. The edges of the two supports are joined together, for example by soldering, welding or adhesive bonding. Adhesive bonding can be carried out using commercial adhesives or adhesive tape. The suspension can be applied in the manner described above to the composite support prepared in this way.

In a particularly preferred embodiment, the superposed supports between which at least one spacer, a drainage material or the like may be arranged can be rolled up before or after, preferably after, the joining of the edges of the supports. The spacing between two composite supports which become juxtaposed on rolling-up can be influenced by use of thick or thin adhesive tapes for joining the edges of the supports. A suspension as described above can be applied to such rolled-up composite supports by, for example, dipping into a suspension. The composite support can be freed of excess suspension by means of compressed air after dipping. The suspension applied to the composite support can be solidified as described above. A gas filter or composite material produced in this way can be used as gas filter in a rolled module.

In a further particular embodiment of the process of the invention, the composite support mentioned can also be produced by unrolling two supports and, if provided, at least one spacer from individual rolls and then laying them on top of one another. The edges of the supports can again be joined by soldering, welding, adhesive bonding or by other suitable methods of joining flat bodies. The suspension can then be applied to the composite support produced in this way. The application of the suspension can be carried out, for example, by spraying or painting the composite support with the suspension or by conveying the composite support through a bath in which the suspension is present. The applied suspension is solidified by one of the abovementioned methods. The composite material produced in this way can be wound onto a roll. A further suspension of a further inorganic layer can be applied to and/or introduced into such a material by repeated application and solidification. The use of different suspensions enables the material properties to be set as desired or according to the intended use. Not only further suspensions but also unsintered ceramic and/or inorganic layers which are obtainable by laminating-on as described above can be applied to this composite material. This embodiment of the process of the invention can be carried out continuously or batchwise, preferably continuously. A composite material produced in this way can be used as gas filter in a flat module.

The support in the gas filter or composite material can, depending on the support material used, be removed again so as to form a ceramic material which no longer contains any support material. If the support material used is, for example, a natural material such as a cotton nonwoven, this can be removed from the composite material by oxidation in a suitable reactor. If a metal, e.g. iron, has been used as support material, this support can be dissolved out of the composite material by treating the composite material with acids, preferably with concentrated hydrochloric acid. If the support material additionally comprised zeolite, flat zeolite bodies can be produced in this way.

It can be advantageous to use the composite material as support for the production of a gas filter or composite material according to the invention.

In a particular embodiment of the process of the invention, it is possible, after solidification of the suspension or ceramic or inorganic layer on and/or in the support material, to treat the dried and strengthened gas filter or composite material with a solution comprising at least one metal compound, preferably a metal salt such as $RhCl_3$. The treatment can comprise, for example, spraying, painting or rolling the solution comprising a metal compound onto the composite material or, for example, dipping the composite material into a solution comprising a metal compound. The gas filter or composite material which has been treated in this way is dried by heating. Heating can be carried out as indicated above. The metal compound which is present in and on or in or on the composite material after application and drying of the solution is reduced to the metal.

It can be advantageous to reduce a metal compound present in and/or on the composite material to the metal using a reducing agent, preferably a borohydride, very particularly preferably $NaBEt_3H$, $LiBEt_3H$, $NaBMe_3H$ or $KBPr_3H$.

It can likewise be advantageous to reduce a metal compound present on or in or else on and in the composite material to the metal by using the composite material as electrode in an electrolysis.

Catalytically active metals can also be applied in and/or on the gas filter or composite material by using a composite material without a catalytically active component as electrode in the electrolysis of a solution comprising a noble metal salt. Here, it is necessary for the composite material to comprise at least $TiO_2$ as an inorganic component and at least one partially electrically conductive support. On application of a voltage of, for example, from 2 to 3 volt, the composite material becomes electrically conductive due to formation of titanium suboxide, which is electrically conductive. As a result of the electrolysis, catalytically active noble metal, preferably in the form of very fine particles, deposits in and/or on the composite material or gas filter.

This makes it possible to produce gas filters which comprise metals and/or noble metals as catalytic components.

It is also possible to use the gas filter or composite material of the invention as support for producing a gas filter according to the invention.

In a particular variant for producing the gas filter of the invention, at least one material-permeable composite material is introduced, preferably rolled or folded, into a container having at least two openings.

The composite material is preferably fixed in the container, preferably by welding, soldering or adhesive bonding, so-that a gas flowing through the filter has to pass through the composite material at least once. The support in the composite material of the gas filter is preferably connected to at least one power lead.

It can be advantageous to combine preferred embodiments of the process of the invention with at least one further preferred embodiment of the process of the invention. It may likewise be advantageous to combine preferred embodiments of the. gas filter of the invention with at least one further preferred embodiment of the gas filter of the invention. With knowledge of the present invention, a person skilled in the art will be able to see further embodiments of the process of the invention, the gas filter of the invention and/or further possible uses of the process of the invention or the gas filter of the invention.

The gas filter of the invention can be used for cleaning gases, in particular waste gases or feed gases, and very particularly preferably gases containing at least one solid.

The gas filters of the invention are preferably used for cleaning waste gases from power stations or for cleaning the exhaust gases from vehicles driven by internal combustion engines. The gas filter of the invention is very particularly preferably used for cleaning the exhaust gases from vehicles driven by diesel engines.

The following examples describe the process of the invention for producing a gas filter according to the invention, without the process being restricted to these examples.

EXAMPLE 1

A suspension comprising 25 g of zirconium isopropoxide was hydrolyzed with 20 g of water. The resulting precipitate was subsequently treated with about 40 g of 25% strength nitric acid and, after the precipitate had dissolved completely, 60 g of aluminum oxide (A16SG from Alcoa) were added. This suspension was stirred until all agglomerates had completely dissolved and ;as applied in a thickness of 60 $\mu$m to a square-weave mesh of stainless steel having a mesh opening of 70 $\mu$m. This composite was exposed to air at 450° C. for 3 seconds and was dried and solidified in this way.

The composite material obtained in this way was used 'for gas filtration. The present composite material is suitable, when installed in a gas filter, for filtering exhaust gases from diesel engines, since solid particles having a size of upward from 0.25 $\mu$m are selectively retained.

The solid particles having a size of greater than 0.25 $\mu$m which are filtered out gradually block the filter during use. Application of a voltage to the support of the composite material enables the filter or the composite material to be heated so that particles able to be destroyed thermally can be removed from the filter by means of oxidation reactions.

EXAMPLE 2

A Pt/Rh catalyst is incorporated on and in a composite material as produced and described in Example 1. For this purpose, a suspension comprising a zirconium oxide sol which had been prepared by hydrolyzing 25 g of zirconium isopropoxide with 20 g of water and subsequently treating the resulting precipitate Edith 40 g of 25% strength nitric acid and container the Pt/Rh catalyst in a concentration of 1% was applied on and in the composite material as support. Solidification of the suspension by heating the composite by means of air at 450° C. for 3 seconds gave a composite material which is suitable for use as or in a gas filter.

This gas filter, too, is very useful for the filtration of gases containing solid particles. The solid particles having a size of greater than 0.25 $\mu$m which are filtered out gradually block the filter during use. Application of a voltage to the support of the composite material enables the filter or the composite material to be heated so that particles able to be destroyed thermally can be removed from the filter.

When the filter has reached a suitable process temperature at which the oxidatively decomposable solids can be destroyed catalytically by oxidation reactions owing to the presence of the Pt/Rh catalyst, the solids which have been filtered out are continually destroyed by oxidation, resulting in considerably reduced blockage of the gas filter. In this embodiment of the gas filter of the invention, energy does not have to be consumed continually for regeneration of the filter, but it is sufficient for the gas filter to be heated at least once during the start-up or running-up phase. Once the reaction in and on the filter is proceeding, the energy liberated in the destruction of the solid particles generates the high temperatures necessary for regeneration of the filter.

What is claimed is:

1. A regenerable gas filter for filtering gases which comprises a bendable and rollable composite material based on at least one open-structured and material-permeable support and having on at least one side of the support and in the interior of the support at least one inorganic component consisting essentially of at least one compound of a metal, a semimetal or a mixed metal and at least one element of main groups III to VII, wherein the composite material has a thickness of 5 to 150 $\mu$m and can be bent to a radius of down to 2 mm and wherein the composite material has pores permeable to particles having maximum size of from 0.1 to 10 $\mu$m and wherein there is present in the composite material at least one inorganic component as a particle size fraction having a particle size of 1 to 250 nm.

2. A gas filter as claimed in claim 1, wherein the open-structured and material-permeable support has intermediate spaces having a size of from 0.02 to 500 $\mu$m.

3. A gas filter as claimed in claim 1, wherein the support comprises at least one material selected from the group consisting of carbon, metals, alloys, glass, ceramics, minerals, plastics, amorphous substances, natural products, or composite materials.

4. A gas filter as claimed in claim 1, wherein the support comprises at least woven, felted or ceramically bound fibers or at least sintered spheres or particles.

5. A gas filter as claimed in claim 1, wherein the support comprises at least one at least partially electrically conductive material.

6. A gas filter as claimed in claim 1, wherein the support is perforated.

7. A gas filter as claimed in claim 1, wherein the material-permeable support has been made material-permeable by laser treatment or ion beam treatment.

8. A gas filter as claimed in claim 1, wherein the support comprises fibers of at least one material selected from the group consisting of carbon, metals, alloys, ceramics, glass, plastics, composite materials, minerals, natural products and amorphous substances or fibers of at least one combination of these materials.

9. A gas filter as claimed in claim 1, wherein the support comprises woven fibers of metal or alloys.

10. A gas filter as claimed in claim 1, wherein the support comprises at least one woven steel mesh.

11. A gas filter as claimed in claim 1, wherein the support comprises at least one woven mesh having a mesh opening of from 5 to 500 $\mu$m.

12. A gas filter as claimed in claim 1, wherein the support comprises at least one expanded metal having a mesh opening of from 5 to 500 $\mu$m.

13. A gas filter as claimed in claim 1, wherein the support comprises a i sintered metal, a sintered glass or a metal nonwoven having a pore width of from 0.1 to 500 $\mu$m.

14. A gas filter as claimed in claim 1, wherein the support comprises at least aluminum, silicon, cobalt, manganese, zinc, vanadium, molybdenum, indium, lead, bismuth, silver, gold, nickel, copper, iron, titanium, platinum, stainless steel, steel or brass or an alloy of these materials or a material coated with Au, Ag, Pb, Ti, Ni, Cr, Pt, Pd, Rh, Ru and/or Ti.

15. A gas filter as claimed in claim 1, wherein the said inorganic component consists essentially of at least one compound of the transition elements and of main groups III to VII or at least one compound of the transition elements and at least one compound of main groups III to VII, with the compounds having a particle size of from 0.01 to 25 $\mu$m.

16. A gas filter as claimed in claim 1, wherein the said inorganic component consists essentially of at least one compound of an element of transition groups III to VIII or at least one element of main groups III to V with the elements Te, Se, S, O, Sb, As, P, N, Ge, Si, C, Ga, Al or B or at least one compound of an element of transition groups III to VII and at least one element of main groups III to V with at least one of the elements Te, Se, S, O, Sb, As, P, N, Ge, Si, C, Ga, Al or B or a mixture of these compounds.

17. A gas filter as claimed in claim 16, wherein the inorganic component comprises at least one compound of the elements Sc, Y, Ti, Zr, V, Cr, Mo, W, Mn, Fe, Co, B, Al, In, Tl, Si, Ge, Sn, Pb, Sb or Bi and the elements Te, Se, S, O, Sb, As, P, N, C or Ga.

18. A gas filter as claimed in claim 1, wherein the inorganic component comprises at least one compound selected from aluminosilicates, aluminum phosphates, zeolites or partially exchanged zeolites.

19. A gas filter as claimed in claim 1, wherein the inorganic component comprises at least one compound selected from amorphous microporous mixed oxides which may be admixed with up to 20% of non-hydrolyzable organic compounds.

20. A gas filter as claimed in claim 1, wherein the inorganic component comprises at least aluminum oxide or titanium oxide.

21. A gas filter as claimed in claim 1, wherein the composite material comprises at least two particle size fractions of at least one inorganic component.

22. A gas filter as claimed in claim 21, wherein the particle size fractions in the composite material have a particle size ratio of from 1:1 to 1:100.

23. A gas filter as claimed in claim 21, wherein the composite material has a ratio of amounts of the particle size fractions of from 0.01:1 to 1:0.01.

24. A gas filter as claimed in claim 23, wherein the composite material comprises particle size fractions having an average particle size of from 0.3 to 3 $\mu$m.

25. A gas filter as claimed in claim 1, wherein the material permeability of the composite material can be limited to particles having a particular maximum size by means of the particle size of the inorganic component used.

26. A gas filter as claimed in claim 1, wherein the composite material has pores which are permeable to particles having a maximum size of from 0.1 to 0.5 $\mu$m.

27. A gas filter as claimed in claim 1, wherein the composite material can be bent to a radius of down to 1 mm.

28. A gas filter as claimed in claim 1, wherein the gas filter has the composite material rolled into a suitable container having at least one gas inlet and at least one gas outlet, with the composite material being arranged so that the gas to be filtered must, after entering the gas filter, pass at least once through the composite material before it can leave the gas filter via the gas outlet.

29. A gas filter as claim in claim 28, wherein thermally decomposable solids or liquids which have been filtered from a filtered gas and block the pores of the composite material are removed from the gas filter by baking the gas filter by application of a voltage to the support of the composite material.

30. A gas filter as claimed in claim 29, wherein the gas inlet and the gas outlet are provided with a flow- or pressure-measuring device by means of which the pressure or the amount of gas entering and leaving the filter is measured and when a preset difference between the measured values, which represents a measure of the blocking of the composite material, is reached, the baking of the gas filter is commenced.

31. A gas filter as claimed in claim 1, wherein the composite material comprises at least one catalytically active component.

32. A gas filter as claim in claim 31, wherein thermally decomposable solids or liquids which have been filtered from a filtered gas and block the pores of the composite material are removed from the gas filter by baking the gas filter by application of a voltage to the support of the composite material.

33. A gas filter as claim in claim 32, wherein the gas inlet and the gas outlet are provided with a flow-or pressure-measuring device by means of which the pressure or the amount of gas entering and leaving the filter is measured and when a preset difference between the measured values, which represents a measure of the blocking of the composite material, is reached, the baking of the gas filter is commenced.

34. A gas filter as claimed in claim 31, wherein the composite material comprises, as catalytically active component, at least one oxide of at least one of the elements Mo, Sn, Zn, V, Mn, Fe, Co, Ni, As, Sb, Pb, Bi, Ru, Re, Cr, W, Nb, Hf, La, Ce, Gd, Ga, In, Tl, Ag, Cu, Li, K, Na, Be, Mg, Ca, Sr and Ba.

35. A gas filter as claimed in claim 31, wherein the composite material comprises at least titanium suboxide as catalytically active component.

36. A gas filter as claimed in claim 31, wherein the composite material comprises, as catalytically active component, at least one metal compound selected from among the compounds of the metals Pt, Rh, Ru, Ir, Au, Ag, Os, Re, Cu, Ni, Pd and Co.

37. A gas filter as claimed in claim 31, wherein the composite material comprises, as catalytically active component, at least one metal selected from among the metals Pt, Rh, Ru, Ce, Ir, Au, Ag, Os, Re, Cu, Ni, Pd and Co.

38. A process for producing a gas filter as claimed in claim 1, which comprises producing a material-permeable composite material by applying, in and on at least one open-structured and material-permeable support, at least one suspension which comprises at least one inorganic component comprising at least one compound of at least one metal, a semimetal or a mixed metal with at least one of the elements of main groups III to VII and a sol and by solidifying the suspension on and in the support material by subsequent heating at least once.

39. The process as claimed in claim 38, wherein the suspension is applied on and in the support by printing, pressing-on, pressing-in, rolling-on, doctor blade coating, painting-on, dipping, spraying or casting.

40. The process as claimed in claim 38, wherein an open-structured and material-permeable support comprising a material selected from the group consisting of carbon, metals, minerals, ceramics, composite materials or at least one combination of these materials is used.

41. The process as claimed in claim 38, wherein the support-comprises at least one material which is at least partially electrically conductive.

42. The process as claimed in claims 38, wherein a woven stainless steel mesh is used as support.

43. The process as claimed in claim 38, wherein the suspension which comprises at least one inorganic component and at least one metal oxide sol, at least one semimetal oxide so! or at least one mixed metal oxide sol or a mixture of these sols is produced by suspending at least one inorganic component in at least one of these sols.

44. The process as claimed in claim 38, wherein the suspension comprises at least one catalytically active component.

45. The process as claimed in claim 38, wherein the sols are obtained by hydrolyzing at least one metal compound, a mixed metal compound or at least one semimetal compound using a liquid, a gas or a solid.

46. The process as claimed in claim 45, wherein the liquid, gas or solid used for hydrolyzing the metal compound is water, water vapor, ice, alcohol or an acid or a combination of these compounds.

47. The process as claimed in claim 45, wherein the compound to be hydrolyzed is added prior to the hydrolysis to alcohol or an acid or a combination of these liquids.

48. The process as claimed in claim 45, wherein at least one metal nitrate, a metal chloride, a metal carbonate, a metal alkoxide compound or at least one semimetal alkoxide compound is hydrolyzed.

49. The process as claimed in claim 48, wherein at least one metal alkoxide compound or at least one semimetal alkoxide compound selected from among the alkoxide compounds of the elements Ti, Zr, Al, Si, Sn, Ce and Y or a metal nitrate, a metal chloride or a metal carbonate selected from among the metal salts of the elements Ti, Zr, Al, Si, Sn, Ce and Y is hydrolyzed.

50. The process as claimed in claim 49, wherein a titanium alkoxide compound is hydrolyzed.

51. The process as claimed in claim 38, wherein the hydrolysis of the compounds to be hydrolyzed is carried out using at least half the molar ratio of water, based on the hydrolyzable group of the hydrolyzable compound.

52. The process as claimed in claim 38, wherein the hydrolyzed compound is treated with at least one organic or inorganic acid.

53. The process as claimed in claim 52, wherein the organic or inorganic acid has a concentration of from 10 to 60%.

54. The process as claimed in claim 52, wherein the hydrolyzed compound is treated with at least one mineral acid selected from the group consisting of nitric acid, sulfuric acid, perchloric acid and hydrochloric acid or a combination of these acids.

55. The process as claimed in claim 38, wherein a titanium dioxide sol acidified with mineral acid is used as sol.

56. The process as claimed in claim 38, wherein at least one inorganic component having a particle size of from 1 to 10,000 nm is suspended in a sol.

57. The process as claimed in claim 56, wherein an inorganic component comprising at least one compound selected from among metal compounds, semimetal compounds, mixed metal compounds and metal mixed compounds with the elements of main groups III to VII, or at least one mixture of these compounds, is suspended.

58. The process as claimed in claim 56, wherein an inorganic component comprising at least one compound from among the oxides of the transition elements or the elements of main groups III to V is suspended.

59. The process as claimed in claim 58, wherein the oxides are selected from among the oxides of the elements Sc, Y, Ti, Zr, V, Nb, Cr, Mo, W, Mn, Fe, Co, B, Al, In, Tl, Si, Ge, Sn, Pb and Bi.

60. The process as claimed in claim 38, wherein at least one inorganic component used is aluminum oxide having a particle size of from 0.3 to 3 $\mu$m.

61. The process as claimed in claim 38, wherein at least one catalytically active component is incorporated into the composite material.

62. The process as claimed in claim 38, wherein at least one catalytically active component is added to the sol.

63. The process as claimed in claim 62, wherein at least one catalytically active component comprises at least one compound selected from among metal compounds, semimetal compounds, mixed metal compounds and metal mixed compounds with the elements of main groups III to VII or organic compounds or at least one mixture of these compounds.

64. The process as claimed in claim 38, wherein at least one catalytically active component having a particle size of from 1 to 10,000 nm is suspended in a sol.

65. The process as claimed in claim 38, wherein at least one noble metal, a noble metal compound or a zeolite is incorporated as catalytic component into the composite material.

66. The process as claimed in claim 38, wherein at least one catalytically active component comprises at least one compound selected from the group consisting of zeolite, silicalite or amorphous mixed oxide.

67. The process as claimed in claim 38, wherein the proportion by mass of the suspended components corresponds to from 0.1 to 500 times the hydrolyzed compound used.

68. The process as claimed in claim 38, wherein the suspension present on and in or else on or in the support is solidified by heating the composite at least once at from 50 to 1000° C.

69. The process as claimed in claim 68, wherein the composite is subjected to a temperature of from 50 to 100° C. for from 10 minutes to 5 hours.

70. The process as claimed in claim 68, wherein the composite is subjected to a temperature of from 100 to 800° C. for from 1 second to 10 minutes.

71. The process as claimed in claim 68, wherein heating is carried out by means of heated air, hot air, infrared radiation, microwave radiation or electrically generated heat.

72. The process as claimed in claim 68, wherein heating is carried out using the support material as electrical resistance heating element.

73. The process as claimed in claim 38, wherein the solidification of the suspension is achieved by applying the suspension on and in a preheated support.

74. The process as claimed in claim 38, wherein at least one support is unwound from a roll, passed at a speed of from 1 to 50 m/h through at least one apparatus which applies the suspension on or in or on and in the support and at least one further apparatus which makes possible the solidification of the suspension on or in or on and in the support by heating and the composite material produced in this way is wound up on a second roll.

75. The process as claimed in claim 38, wherein an unsintered ceramic or inorganic layer is applied to a support and is strengthened by heating.

76. The process as claimed in claim claim 38, wherein the dried and strengthened composite material is impregnated with a solution comprising at least one metal salt, the composite material which has been treated in this way is dried by heating and the metal salt which is present in and on or else in or on the composite material is reduced to metal.

77. The process as claimed in claim 38, wherein a metal salt which is present in the composite material is reduced to metal by treating the composite material with a reducing agent.

78. The process as claimed in claim 77, wherein the reducing agent used is a borohydride.

79. The process as claimed in claim 38, wherein a metal salt which is present in or on or else in and on the composite material is reduced to metal by using the composite material as electrode in an electrolysis.

80. The process as claimed in claim 38, wherein a material-permeable composite material is introduced into a container having at least two openings.

81. The process as claimed in claim 80, wherein the composite material is introduced into folded or rolled form in the container.

82. The process as claimed in claim 38, wherein the composite material is fixed in the container so that a gas flowing through the filter has to pass through the composite material at least once.

83. The process as claimed in claim 82, wherein the composite material is fixed in he container be welding, soldering or adhesive bonding.

84. The process as claimed in claim 38, wherein the support in the composite material is connected to at least one power lead.

85. A process of cleaning waste or feed gases with the filter of claim 1, comprising contacting the gases with the filter.

86. A process comprising cleaning waste gases from power stations with the filter of claim 1, comprising containing the gases with the filter.

87. A process of cleaning the exhaust gases of vehicles driven by internal combustion engines with the filter of claim 1, comprising contacting the gases with the filter.

88. A process of cleaning the exhaust gases of vehicles driven by diesel engines with the filter of claim 1, comprising contacting the gases with the filter.

89. A regenerable gas filter which comprises a bendable and rollable composite material which is obtained by applying a suspension which comprises at least one inorganic component consisting essentially of a compound of at least one metal, a semimetal or a mixed metal and at least one element of main groups III to VII, and a sol to an open-structured and material-permeable support to obtain an intermediate composite and subsequently heating the intermediate composite at least once during which the suspension comprising at least one inorganic component is solidified in or on and in the support, wherein the composite material has a thickness of 5 to 150 $\mu$m and can be bent to a radius of down to 2 mm, wherein the composite material has pores permeable to particles having a maximum size of from 0.1 to 10 m$\mu$, and wherein there is present in the composite material at least one inorganic component as a particle size fraction having a particle size of 1 to 250 nm.

90. A regenerable gas filter according to claim 89 wherein the suspension comprises $Al_2O_3$, $SiO_2$, $TiO_2$ or $ZrO_2$ particles suspended in a sol obtained by hydrolyzing a compound of Ti, Zr, Al, Sn, Ce or Y, and wherein the support comprises metal or glass fibers.

91. A regenerable gas filter according to claim 90 wherein the inorganic component is aluminum oxide having a particle size of 0.3 to 3 $\mu$m.

92. A regenerable gas filter according to claim 90 wherein the suspension comprises aluminum oxide suspended in a sol obtained by hydrolyzing a zirconium compound.

93. A regenerable gas filter which comprises a composite material which is obtained by application of a suspension in which the suspension comprises at least one inorganic component consisting essentially of a compound of at least one metal, a semimetal or a mixed metal and at least one element of main groups III to VII in at least one sol which is a metal oxide sol, semimetal oxide sol or a mixed metal oxide sol to an open-structured and material-permeable mesh support and subsequently heating at least once during which the suspension comprising at least one inorganic component is solidified in or on and in support, wherein the ratio of the particle size of the suspended component to the mesh or pore opening of the mesh support is from 1:1000 to 50:1000 and wherein the composite material has a thickness of from 5 to 1000 $\mu$m, and wherein the mesh opening of the support is 50 to 500 $\mu$m.

94. A regenerable gas filter according to claim 93, wherein at least one catalytically active component is suspended in the sol.

95. A regenerable gas filter which comprises a bendable or rollable composite material which is obtained by applying a suspension of aluminum oxide in a sol of hydrolyzed zirconium oxide to a stainless steel mesh as a support to obtain an intermediate composite and subsequently exposing the intermediate composite to air at 450° C. for 3 seconds, during which the said suspension is solidified in or on and in the support.

96. A regenerable gas filter according to claim 95, wherein the sol contains a suspended Pt/Rb catalyst.

* * * * *